(12) United States Patent
Devanagondi et al.

(10) Patent No.: US 7,577,136 B1
(45) Date of Patent: Aug. 18, 2009

(54) ETHERNET SWITCH FABRIC INTERFACE

(75) Inventors: Harish R. Devanagondi, Saratoga, CA (US); Harish P. Belur, Saratoga, CA (US); Simon Sabato, Sunnyvale, CA (US); Jasper Yeung, Daly City, CA (US); You-Wen Yi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 671 days.

(21) Appl. No.: 11/155,287

(22) Filed: Jun. 17, 2005

Related U.S. Application Data

(60) Provisional application No. 60/581,166, filed on Jun. 17, 2004.

(51) Int. Cl.
*H04L 12/56* (2006.01)
(52) U.S. Cl. ...................................... 370/389

(58) Field of Classification Search ............. 370/395, 370/469, 230.1, 235, 389; 713/153
See application file for complete search history.

(56) References Cited

U.S. PATENT DOCUMENTS

| | | | | |
|---|---|---|---|---|
| 6,205,145 | B1* | 3/2001 | Yamazaki | 370/395.65 |
| 6,674,721 | B1* | 1/2004 | Dittia et al. | 370/235 |
| 7,379,422 | B2* | 5/2008 | Nation | 370/230.1 |
| 2004/0143734 | A1* | 7/2004 | Buer et al. | 713/153 |
| 2004/0264505 | A1* | 12/2004 | Miki et al. | 370/469 |

\* cited by examiner

*Primary Examiner*—Derrick W Ferris
*Assistant Examiner*—Gbemileke Onamuti
(74) *Attorney, Agent, or Firm*—Tucker Ellis & West, LLP

(57) ABSTRACT

Enhanced switching functionality is achieved by a switching system having of traffic management devices connected with a generic Ethernet switch fabric and an optional flow control device. The traffic management devices use an encapsulated Ethernet frame format to provide an additional of addressing.

12 Claims, 12 Drawing Sheets

Internal Network Frame Format

Standard Ethernet Frame Format

Compressed Ethernet Frame Format Option 2

QueueFlowControl
Frame Format

ETHERNET SWITCH FABRIC INTERFACE

CROSS-REFERENCES TO RELATED APPLICATIONS

The present application claims priority under 35 U.S.C. § 119(e) to U.S. Provisional Patent Application No. 60/581,166, filed on Jun. 17, 2004, entitled "Ethernet Switch Fabric Interface" which is incorporated by reference in its entirety.

BACKGROUND OF THE INVENTION

1. Field of the Invention

The present invention relates to network switching and switch fabrics. More particularly, the present invention relates to a system and method for using standard Ethernet switches or switched Ethernet networks as switch fabrics.

2. Description of the Related Art

A network switch is a device that provides a switching function (i.e., determines a physical path) in a data communications network. Switching involves transferring information, such as data packets or frames, among entities of the network. Typically, a switch is a computer having a plurality of circuit cards coupled to a backplane. In the switching art, the circuit cards are typically called "blades." The blades are interconnected by a "switch fabric." Each blade includes a number of physical ports that couple the switch to the other network entities over various types of media, such as Ethernet, FDDI (Fiber Distributed Data Interface), or token ring connections. A network entity includes any device that transmits and/or receives data packets over such media.

The switching function provided by the switch typically includes receiving data at a source port from a network entity and transferring the data to a destination port. The source and destination ports may be located on the same or different blades. In the case of "local" switching, the source and destination ports are on the same blade. Otherwise, the source and destination ports are on different blades and switching requires that the data be transferred through the switch fabric from the source blade to the destination blade. In some cases, the data may be provided to a plurality of destination ports of the switch. This is known as a multicast data transfer.

Switches operate by examining the header information that accompanies data in the data frame. Various types of header information are defined by networking standards bodies such as the IEEE and IETF. The canonical model to understand the type of header information available on data frames is the International Standards Organization (ISO) 7 layer Open Systems Interconnection (OSI) model. Based on this model, header information in any (or all) layers between 1 and 7 may be present in a packet. For most switches, switching is performed based on header information belonging to OSI layers 2, 3 and 4.

Ethernet is a widely used layer 2 network protocol that uses CSMA/CD technology. An Ethernet frame has six fields. These fields include a preamble, a destination address, source address, type, data and a frame check sequence. In the case of an Ethernet frame, the switch will determine the physical path of the frame based on the destination addresses (and optionally, the class of service) of the frame. Ethernet was originally standardized at a speed of 10 Mbps—over the years various speeds of Ethernet have been standardized at rates of 100 Mbps, 1 Gbps and 10 Gbps.

A digital switch will typically have physical ports that are configured to communicate using different protocols at different data rates. For example, a blade within a switch may have certain ports that are 10 Mbit/s, or 100 Mbit/s ports. It may have other ports that conform to optical standards such as SONET and are capable of such data rates as 10 gigabits per second.

A switch fabric of suitable bandwidth is needed to transport data between source blade and destination blade.

A switch fabric is limited by its capacity to forward traffic per port and the total bandwidth or number of bits per second that can be switched without blocking or slowing the data traffic.

Traditionally, Ethernet switches have provided the highest switching capacity for a given cost. Conversely, Ethernet switches have been the lowest cost for a given switching bandwidth.

What is needed is a method and system to use a commodity Ethernet switch to function as a switch fabric in a chassis-based system.

SUMMARY OF THE INVENTION

The present invention provides one or more embodiments of a method and system by which a commodity Ethernet switch chip may be used as a switch fabric in a chassis based switching system. A chassis based system comprises one or more Traffic Management Devices (TMDs) on a line card, interconnected by a switch fabric. Each TMD is communicatively coupled to a port of the switch fabric, and connected to a number of networks. Each TMD has knowledge of other TMDs connected to the switch fabric. The switch fabric and all TMDs connected to it appear as a single switching system ("switching system") to the networks connected to any of such TMDs. The switch fabric does not understand the external network address space used by the TMDs to communicate with client devices to which it is coupled. The switch fabric is switching packets in an internal address space that is distinct from the external address space being used to communicate with client devices.

When a network entity A such as a client device transmits a packet through the switching system to another network entity B, the packet first arrives at the TMD connecting A with the switch fabric, $TMD_A$. $TMD_A$ examines the packet's header for the destination address. Based on the packet's header information, $TMD_A$ determines how the packet should be forwarded through the switching system. This determines the destination switch fabric port to which the packet should be sent. In order to make sure that the switch fabric transfers the packet to the proper destination, and the packet gets processed appropriately at the destination TMD, $TMD_A$ encapsulates the packet in two additional headers—one interpreted by the destination TMD—i.e., $TMD_B$ and one interpreted by the switch fabric. The header interpreted by $TMD_B$ (referred to here as the "Forwarding Header") is usually a proprietary header that communicates system specific information—and is only understood by the TMDs in the system. Since an Ethernet switch is being used as the switch fabric, the header interpreted by the switch fabric is an Ethernet header (i.e., this is in addition to the Ethernet Header that is already present on the packet as it is received from the network). This additional Ethernet header is purely internal—i.e., the destination address space used on this header is limited to indicating internal switch fabric port destinations—and not eventual network destinations. The internal address space used may overlap with the addresses being used on the external network—this does not affect the accuracy of packet forwarding. The switch fabric transfers the Ethernet frame to the port coupled with $TMD_B$. When $TMD_B$ receives the Ethernet frame, it extracts the encapsulated packet out of the Ethernet frame (i.e., it will remove the Ethernet header attached to the packet only to get it across the switch fabric), perform any required processing indicated by the Forwarding Header (this may include some editing of the packet header), and send the packet to its intended destination, B.

The Forwarding Header may contain a variety of information—including instructions on how to process the packet to the destination TMD ($TMD_B$) and the port of entry of the packet on the source TMD ($TMD_A$). It is important to communicate the port of entry of the packet to the remote TMD to ensure that in the case of multicast data transfer, a packet is never re-transmitted out of its port of entry to the switching system.

In one embodiment, each TMD is connected to a flow control device (FCD) associated with the switch fabric. Each TMD reports to FCD about its traffic (size, destination, and priority of packets) to and from the switch fabric. The FCD keeps track of traffic flows among TMDs, and sends queue flow control frames ("QFCF") to TMDs, containing flow control information based on the congestion state of the switch fabric's ports. The TMDs use the QFCF to limit traffic to congested switch fabric ports, thereby minimizing frame loss, or to prevent head of the line blocking. Without the presence of the FCD, use of an Ethernet switch as a switch fabric is vulnerable to Head of the Line blocking and unfair bandwidth allocation among several source TMDs that are trying to send traffic to the same destination TMD.

DETAILED DESCRIPTION OF THE EMBODIMENTS

Figure 1:
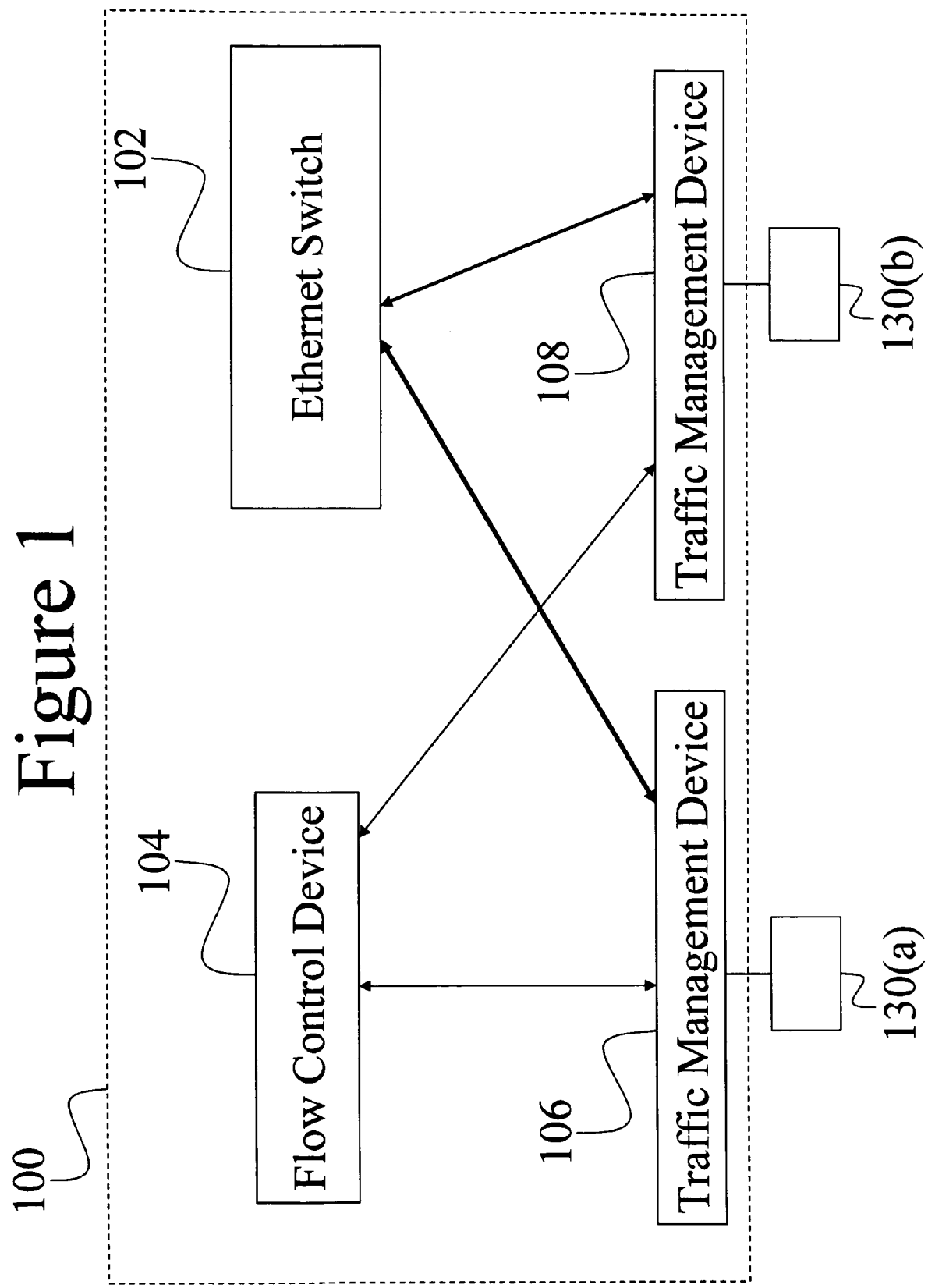
FIG. 1 is a simplified block diagram illustrating an enhanced switching system according to an embodiment of the present invention.

The present invention is directed to a method and system to provide switch fabric functionality using existing generic Ethernet switch chips. A switching system 100 comprises an Ethernet switch 102 functioning as a switch fabric and a plurality of traffic management devices ("TMDs") 106, 108. A plurality of client device 130a, 130b is coupled to respective TMDs 106, 108. The address space used in the networks connected by the TMDs is different from the address space used by the Ethernet switch functioning as a switch fabric to switch between TMDs. For clarity, we provide the following definitions:

Switching System—The system 106 composed of the TMDs 106, 108 and the Ethernet switch fabric/switch 102.

External Network—The network that interconnects the client devices 130a, 130b.

Internal Network—The network that interconnects the TMDs 106, 108.

External Address—The addresses of the client devices 130a, 130b. These addresses are unique across the external network.

Internal Address—The addresses of the TMDs on the internal network. They are only unique among the TMDs—i.e., even if the address of a TMD on the internal network is the same as that of a client device on the external network, this will not cause any conflicts in this architecture.

External Network Packet—The format of a packet on the external network. This format is the standard Ethernet format.

Switch Fabric—A device that interconnects TMDs 106, 108. A Switch Fabric receives a packet on a source port, looks up certain bits in the packet header and based on information in those bits sends a packet to a destination port (or ports).

Internal Network Packet—The format of a packet on the internal network. This packet is an External Network Packet with two headers prepended—a forwarding header and an Internal Network Header.

Forwarding Header—A header prepended to a packet to communicate information between TMDs 106, 108. This header communicates information to the TMDs 106, 108 about how to process the packet, and also contains the port of entry of the packet into the switching system.

Internal Network Header—An Ethernet header prepended to the packet (which has already been prepended with a Forwarding Header), to make sure that the Ethernet switch fabric 102 can forward the resulting packet to the appropriate destination TMD 106, 108. Since the Ethernet Switch Fabric 102 will forward only a legal Ethernet packet, the Internal Network Header must be a legal Ethernet header. However, the information in the Internal Network Header is essentially the same as in the Forwarding Header.

External Network Header—An Ethernet header attached to the payload that needs to be transferred among entities of the External Network.

When a network entity A, such a client device 130a, sends a packet to a network entity B, such a client device 130b, through the switching system 100, the TMD 106 connected to network entity A 130a encapsulates the External Network Packet inside a Forwarding Header and an Internal Network Header, creating an Internal Network Packet. The Internal Network Packet is addressed to the Internal Address of TMD 108, and submitted to the switch fabric 102. The switch fabric 102, after receiving the Internal Network Packet, transfers it to the correct destination port. After receiving the Internal Network Packet, TMD 108 extracts the External Network Packet, examines the forwarding header, performs any processing on the packet indicated by the forwarding header and forwards the packet to network entity B 130b.

TMDs 106, 108 in the switching system 100 submit traffic information to an optional flow control device (FCD) 104, which keeps track of states of the switch fabric's ports. FCD 104 sends QFCF to TMDs 106, 108 containing flow control information. TMDs 106, 108 use the QFCF to stop transmission from queues that are creating switch fabric congestion. This prevents head of the line blocking caused by link level flow control and prevents packet drops in the switch fabric. QCFC messages sent by the FCD 104, enable transmission from the blocked queues once switch fabric congestion has eased.

Each TMD 106, 108 is capable of storing some fields of the Forwarding Header in the Internal Network Header, while not affecting the switch fabric's ability to transfer Ethernet frames to the correct port. This function takes advantage of the fact that most Ethernet switches forward frames based only on some specific fields in the Ethernet header, and other fields are not used. The recipient TMD 106, 108 is capable of recognizing the Forwarding Header embedded in some fields of the Internal Network Header and using that information to recreate the Forwarding Header. This "overloading" of the Internal Network Header with fields from the Forwarding Header reduces the number of overhead bytes that need to be carried to transfer a packet across a switch fabric, and therefore improves the efficiency of the system.

A TMD 106, 108 is a separate computer, a circuit cards, or other device with equivalent functionalities known to persons of ordinary skill in the art. A TMD 106, 108 is coupled to the switch fabric 102 through a backplane, or through Ethernet over various types of media.

The invention will now be further described with reference to FIGS. 1-8.

FIG. 1 is a simplified block diagram of an example switching system 100 to provide enhanced switching functionality without requiring special support from the generic Ethernet switch fabric 102. The switching system 100 includes the Ethernet switch 102, two TMD 106 and 108, and a FCD 104. Only one Ethernet switch 102 and two TMD 106 and 108 are shown for clarity. In general, any number of these components can be included in the switching system 100 of the present invention.

Network entity or client device 130(*a*) is connected to the switching system 100 through TMD 106. Likewise, network entity 130(*b*) is connected to the switching system 100 through TMD 108. Both TMDs 106 and 108 are connected to both FCD 104 and Ethernet switch 102. For clarity only two client devices 130(*a*) and 130(*b*) are shown in FIG. 1. In general, any number of these components can be present in the network and communicate using the switching system 100 of the present invention.

The networks connected to the switching system 100 share a network address space. The network entities 130(*a*) and 130(*b*) each has a uniquely identifiable external network address, and is aware of or is capable of learning each other's network address. As later shown in FIG. 8, TMDs 106, 108 know or have an ability to learn the binding between the External Address and network entity. Each TMD 106, 108 also maintains a binding between Internal Address, and the TMD 106, 108 to which a packet must be forwarded to reach a specific network entity. The Ethernet Switch 102 is NOT aware of the External addresses—but operates in an internal address space that only identifies the TMDs 106, 108 as destinations for the packets.

When network entity 130(*a*) sends an External Network Packet to network entity 130(*b*), 130(*a*) places 130(*b*)'s External Address in the External Network Packet header. When the External Network Packet arrives at TMD 106, TMD 106 examines the External Network Header and determines the device on the internal network that is connected to network entity 130(*b*) as TMD 108. TMD 106 retrieves TMD 108's Internal Address through a mapping table. Then TMD 106 encapsulates the External Network Packet into an Internal Network Packet, using TMD 108's address as the destination address of the Internal Network Packet, and sends the Internal Network Packet to the Ethernet switch 102. TMD 106 also inserts the Forwarding Header between the External Network Header and the Internal Network Header.

Figure 2A:
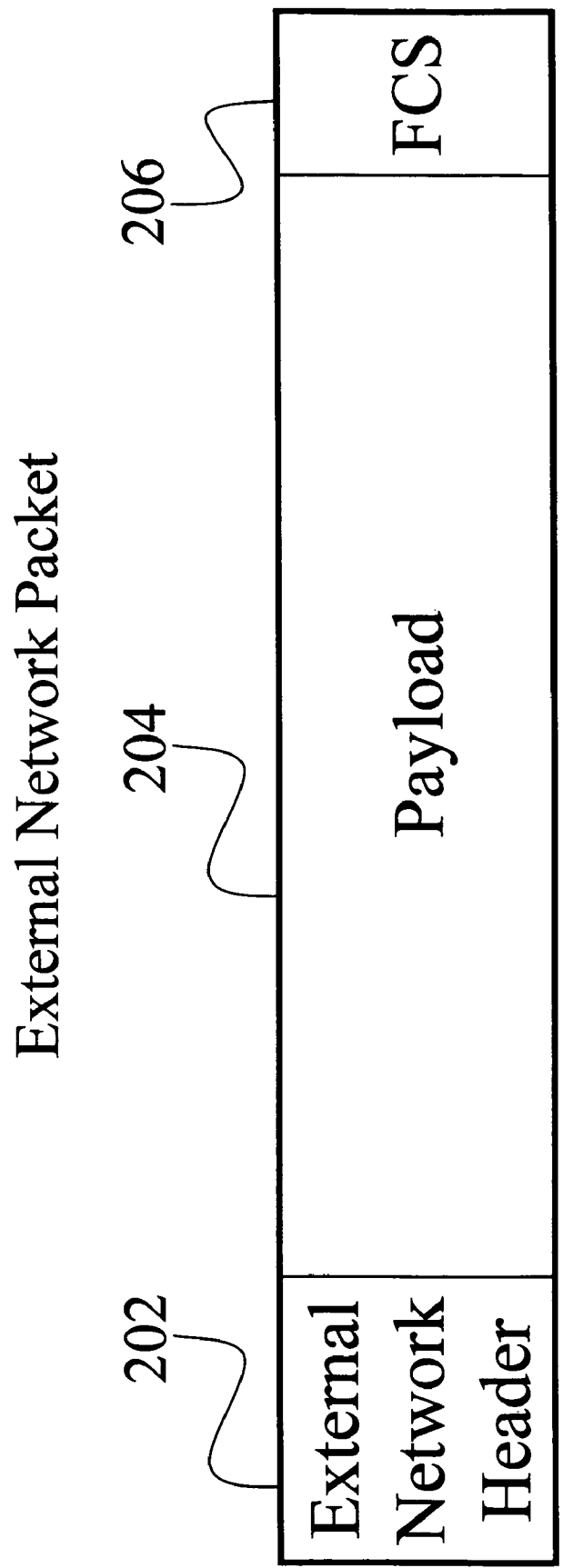
FIG. 2a is a simplified diagram illustrating the standard Ethernet frame format.
Figure 2B:
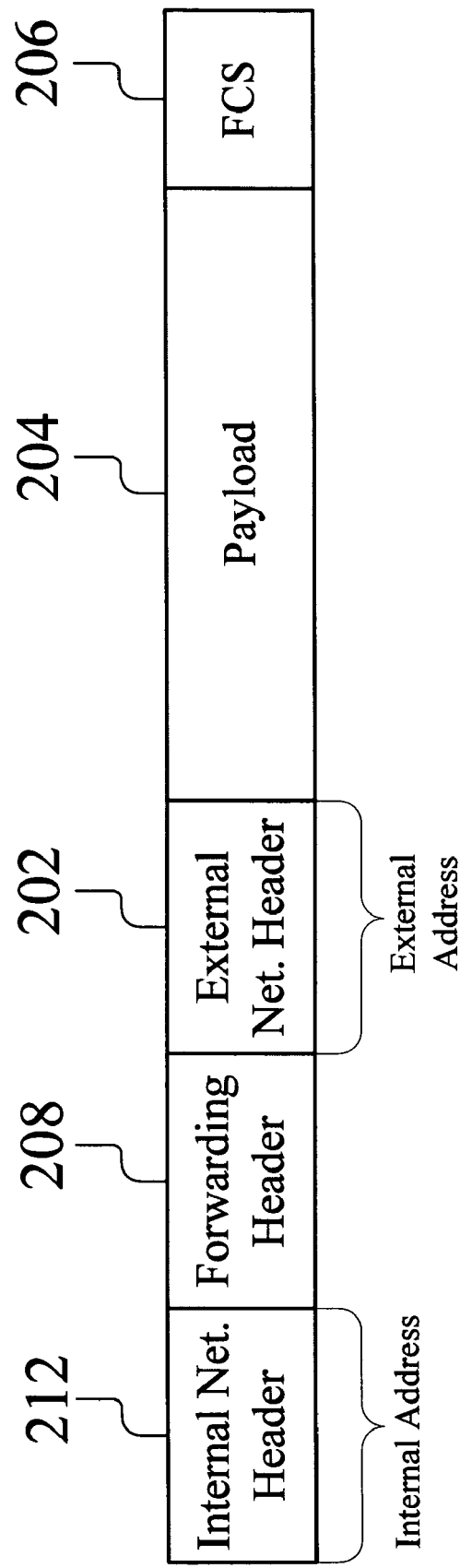
FIG. 2b is a simplified diagram illustrating the format of Ethernet frame generated by a TMD according to an embodiment of the present invention.

As shown in FIG. 2*a*, a standard Ethernet frame includes an External Network Header 202 which holds destination information, a payload 204, and a FCS (Frame Check Sequence) field 206 to detect errors. This is the format used for the External Network Packet. The Internal Network Packet generated by TMD 106 has a format shown in FIG. 2*b*. The generated Internal Network Packet format includes an External Network Header 202, a payload 204 and FCS field 206, just as in a standard Ethernet frame shown in FIG. 2*a*. It should be noted that the External Network Address for the packet is stored in the External Network Header 202. In addition, the Internal Network Packet format prepends an Internal Network Header 212 and a forwarding header 208. Header 212 contains the Internal Address for the packet. Forwarding Header 208 provides packet processing information and ingress port information to the destination TMD 108.

When the Ethernet switch 102 receives the Internal Network Packet, it transfers the Internal Network Packet to the port associated with TMD 108's Internal Address. To the Ethernet switch 102 (and other switches which form a part of the switch fabric of the switching system), the Internal Network Packet format is processed like any other Ethernet packet and the Internal Network Packet format is indistinguishable from any other Ethernet packet to be processed. From switch 102's perspective, the External Network Header 202 that stores the External Address appears as part of the payload.

When TMD 108 receives the Internal Network Packet from Ethernet switch 102, TMD 108 examines the Internal Packet Header 212 and recognizes that an External Network Packet is encapsulated inside the Internal Network Packet. TMD 108 extracts the External Network Packet and Forwarding Header from the internal network frame, performs any processing required by the Forwarding Header, and forwards the packet to the destination network entity 130(*b*).

Because the Ethernet switch 102 only needs to know the address of the TMDs 106, 108, the address table of the Ethernet switch 102 does not (and should not) contain the External Addresses of network entities 130*a* and 130*b*. Therefore, with a limited address table capacity, Ethernet switch 102 can provide switch fabric functionality in a network that has an arbitrary number of External Addresses.

Figure 3A:
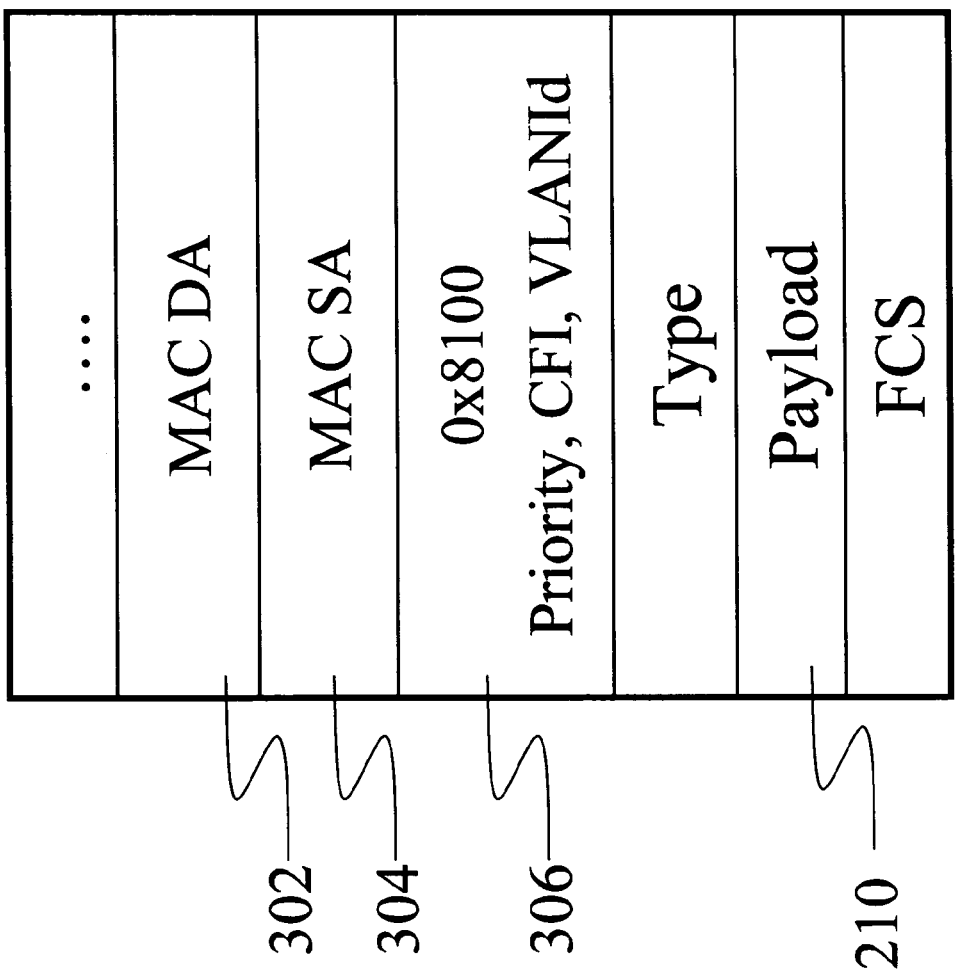
FIG. 3a is another simplified diagram illustrating the standard Ethernet frame format.

FIG. 3*a* shows another view of a standard Ethernet Frame. The External Network Header 202 or 212 includes MAC DA (Destination Address) 302 and MAC SA (Source Address) 304, in addition to other information. When transferring the Ethernet Frame, the Ethernet switch 102 only needs part of the information in the Internal Network Header 212 to transfer the Ethernet Frame to the correct destination port (typically Destination Address (& VLANId)). As a result, the present invention stores some part of the Forwarding Header in the Internal Network Header 212 to enhance switching traffic efficiency. For example as is described below, since routing by the switch 102 is determined by destination address (& VLANId) information, the source address field can be used to carry Forwarding Header information.

Figure 3B:
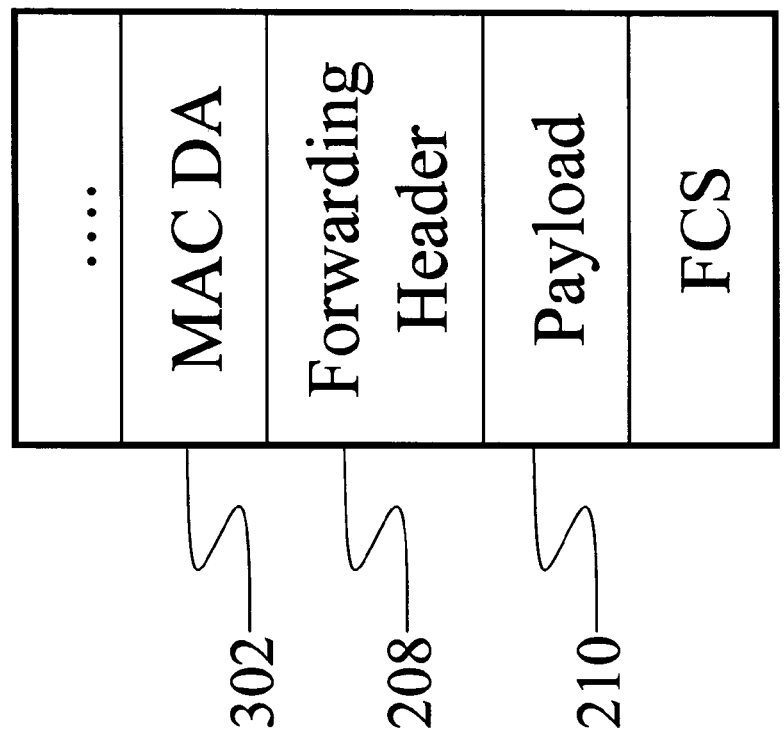
FIGS. 3b and 3c are simplified diagrams illustrating the format of Ethernet frame generated by a TMD according to an embodiment of the present invention.

In one embodiment, the Ethernet switch 102 is pre-programmed to provide each TMD 106, 108 in the switching system 100 a static Internal Address. TMD 106 puts TMD 108's Internal Address in the MAC DA field 302 of the Internal Network Header 212, and stores the Forwarding Header 208 in the Ethernet header space between the MAC DA field 302 and regular payload field 210, as illustrated in FIG. 3*b*. When Ethernet switch 102 receives the internal network packet, the switch 102 checks its statically programmed address table, and transfers the Internal Network Packet solely based on the MAC DA field 302 of the Internal Network Header 212. When TMD 108 receives the Internal Network Packet and examines the Internal Network Header 212. TMD 108 recognizes the Forwarding Header saved in the Ethernet frame header 212, extracts the External Network Packet from the Ethernet frame, performs any processing as required by the Forwarding Header and sends the external network packet to its destination.

Figure 3C:
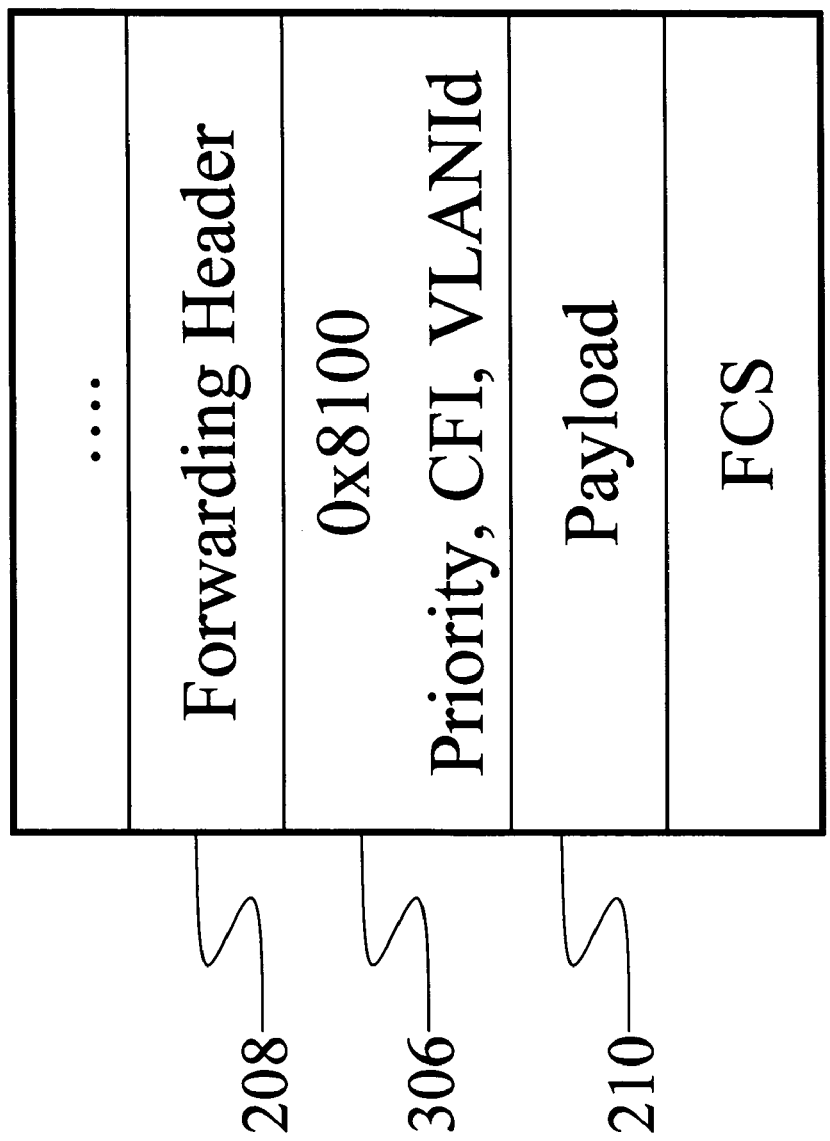

In one embodiment, the Forwarding Header is stored instead of the MAC DA field 302 and MAC SA field 304 in order to save bandwidth across the Ethernet switch 102 as shown in FIG. 3c. In this case, the Ethernet switch 102 switches the Internal Network Packet based on the element 306.

When TMD 106 needs to multicast an Internal Network Packet to multiple TMDs, it uses the native Ethernet multicasting capability of switch fabric 102. Depending on the destination TMD list, static multicast addresses are configured in the forwarding table of Ethernet switch 102. TMD 106 then sends the Internal Network Packet with MAC DA 302 set to the appropriate multicast address. When the Ethernet switch 102 receives an Internal Network Packet with a multicast MAC DA, it will make multiple copies and deliver it to all destination ports based on its forwarding table configuration. Each destination TMD that receives the Internal Network Packet will extract the External Network Packet, perform any processing specified by the Forwarding Header and transmit the packet to its destination(s).

Those skilled in the art will recognize that the present invention is particularly advantageous because the Forwarding Header can overlap with parts of the Ethernet Header, reducing the overhead and increasing the effective switching capacity of the Ethernet switch 102.

As shown in FIG. 1, FCD 104 is connected to both TMDs 106 and 108. To network entities connected to the switching system 100, FCD 104 appears inside the switching system 100, even though it may be geographically apart from the Ethernet switch 102.

The TMDs 106, 108 send a TxNotificationEntry message to FCD 104 for traffic sent to the Ethernet switch 102. In one embodiment, a TMD 106, 108 sends a TxNotificationEntry message for each internal network packet sent to the Ethernet switch 102. In another embodiment, a TMD 106, 108 only sends a TxNotificationEntry message when accumulated by various mechanisms, for example, periodic notification of the number of bytes transmitted to each destination TMD, etc.

Figure 4A:
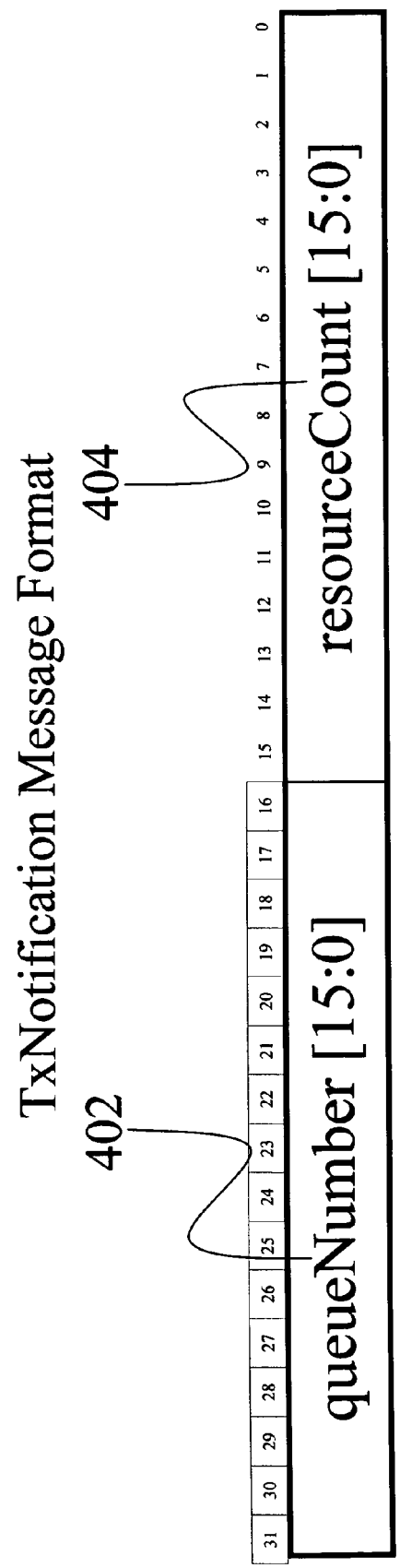
FIG. 4a is a diagram illustrating the format of a TxNotification message.

FIG. 4a illustrates the format of a TxNotificationEntry message. A TxNotificationEntry message has a queueNumber field 402 and a resourceCount field 404. In one embodiment, the queueNumber field 402 contains information of the destination address of the internal network packet transmitted to the Ethernet switch 102. In another embodiment, the queueNumber field 402 contains information of both the destination address and the priority of the internal network packet transmitted. The resourceCount field 404 specifies resources used by the internal network packet in a fabric-dependent manner (byte count, cell count, buffer count, etc.). A TMD 106, 108 can pack multiple TxNotificationEntry messages in a single Ethernet frame to send to FCD 104. Those skilled in the art will realize that in FIGS. 4a and 4b the TxNotificationEntry message format and the RxNotificationEntry message format are shown with example bit sizes. Those bit lengths for the queueNumber field 402 and resourceCount field 404 are only provided by way of example, and any variety of other bit lengths depending on the architecture may be used with the present invention.

In one embodiment, a TMD 106, 108 derives the resourceCount field 404 by indexing a lookup table with the length of the packet being transmitted. The lookup table is programmed in a fabric dependent manner. Fabrics have varying memory organizations and so a packet of a specified length may use a different number of resources depending on the fabric.

The TMDs 106, 108 send an RxNotificationEntry message to FCD 104 for traffic received from the switch fabric 102. In one embodiment, a TMD sends an RxNotificationEntry message for each internal network packet received from the Ethernet switch 102. In another embodiment, a TMD only sends an RxNotificationEntry message when accumulated by various mechanisms, for example, periodic notification of the number of bytes received, etc.

Figure 4B:
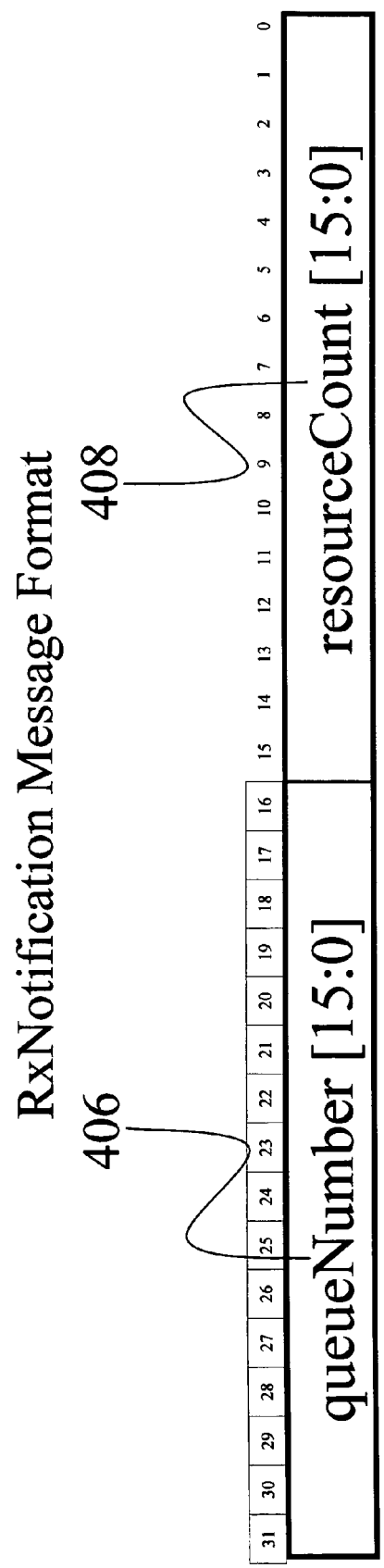
FIG. 4b is a diagram illustrating the format of an RxNotification message.

FIG. 4b illustrates the format of an RxNotificationEntry message. An RxNotificationEntry message, like a TxNotificationEntry message, includes a queueNumber field 406 and a resourceCount field 408, and both fields are similarly defined as in a TxNotificationEntry. A TMD 106, 108 can pack multiple RxNotificationEntry messages in a single Ethernet Frame to send to FCD 104. In one embodiment, a TMD 106, 108 packs both RxNotificationEntry messages and TxNotificationEntry messages in one single Ethernet Frame.

By examining TxNotificationEntry and RxNotificationEntry messages it received, FCD 104 keeps track of the traffic of Ethernet switch 102's ports. In case of congestion, FCD 104 submits a Queue Flow Control frame to relevant TMDs 106, 108.

Figure 5:
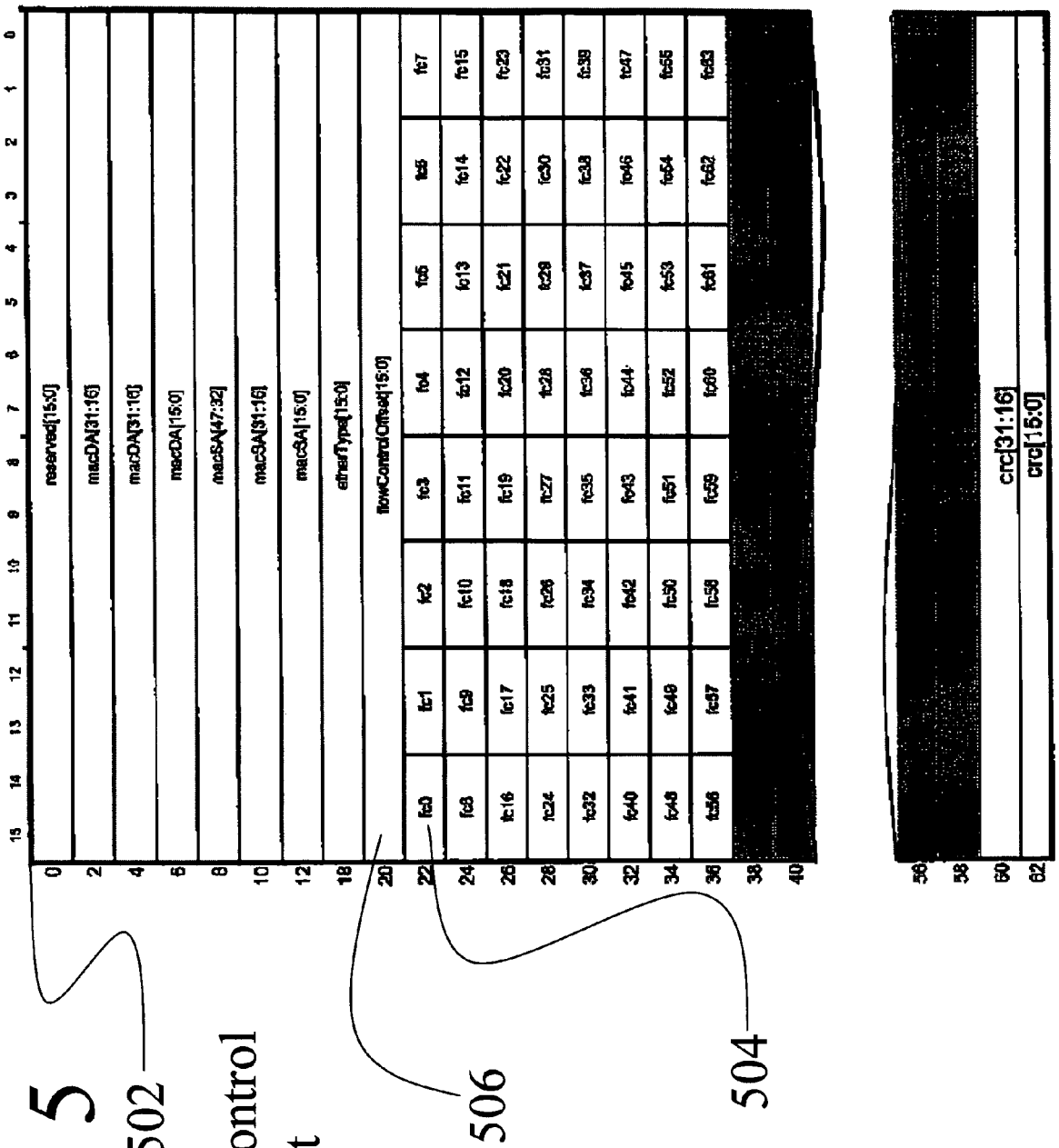
FIG. 5 is a simplified diagram illustrating the format of a QueueFlowControl message.

A Queue Flow Control frame conforms to the IEEE standard 802.3x "PAUSE" frame format, but includes advanced control flow information in the field reserved by the standard. FIG. 5 illustrates the format of a Queue Flow Control frame. The Queue Flow Control frame 502, which can be as long as fits in a legal Ethernet Frame, includes a flowControlOffset field 506, and as many entries as fit in a legal Ethernet Frame. The flowControlOffset field 506 indicates the first queue to which the flow control message applies and multiple Flow Control Entries—which apply to one queue each. In one embodiment, the value of each flow control entry has the following meaning: $00_2$ and $01_2$: no change in state; $10_2$: stop sending data; $11_2$: resume sending data.

In one embodiment, a recipient TMD 106, 108 can calculate each entry's corresponding queue by adding the value in the flowControlOffset field 506 with the entry's position within the QueueFlowControl frame 502. The recipient TMD can then take the appropriate action to either shut off traffic from the specific queue (in case of congestion), or resume transmission (in case congestion has eased).

The Ethernet switch 102 also sends out standard 802.3x "PAUSE" frame without the advanced flow control information. When a TMD 106, 108 receives such an $802.3x$ frame, it recognizes it and responds by holding off transmitting all packets to the Ethernet switch 102.

With the queue flow control information, rather than holding all traffic to the switching system 100, network entities can still send packets to ports of the Ethernet switch 102 that are not congested. When a network entity connected to a generic Ethernet switch fabric receives a regular 802.3x "PAUSE" frame from the fabric, it halts all traffic to the fabric. The queue flow control information provides more flexibility for the switching system 100 and improves its performance.

Figure 6:
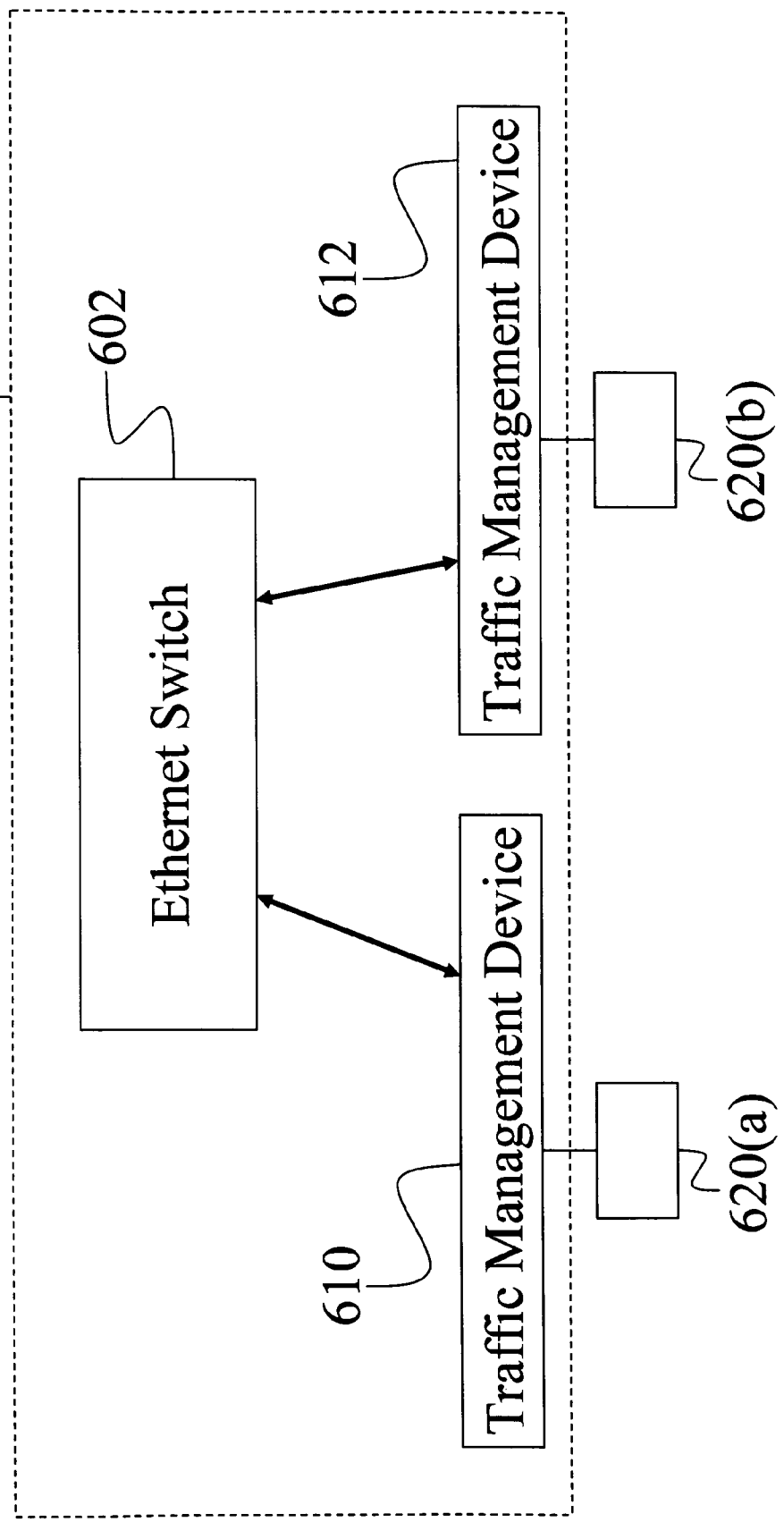
FIG. 6 is a simplified block diagram illustrating an enhanced switching system according to an embodiment of the present invention.

FIG. 6 is a simplified block diagram of an example switching system 600 without FCD 104. The switching system 600 comprises an Ethernet switch 602 connecting with TMD 610 and TMD 612. The switching system 600 can provide the advantage of using a standard Ethernet switch as a switch fabric, address space reuse and efficiency of using fields in the External Packet Header to transmit the Forwarding Header, just as described above for the switching system 100.

In one embodiment, without the help of the FCD 104, the switching system 600 can still provide advanced switching flexibility. In this embodiment, Ethernet switch 602 is capable of generating Queue Flow Control Messages and does not require an external FCD. Based on its internal congestion state, Ethernet switch 602 sends Queue Flow Control Messages which are received and processed identically to having been received from FCD 104.

Figure 7:
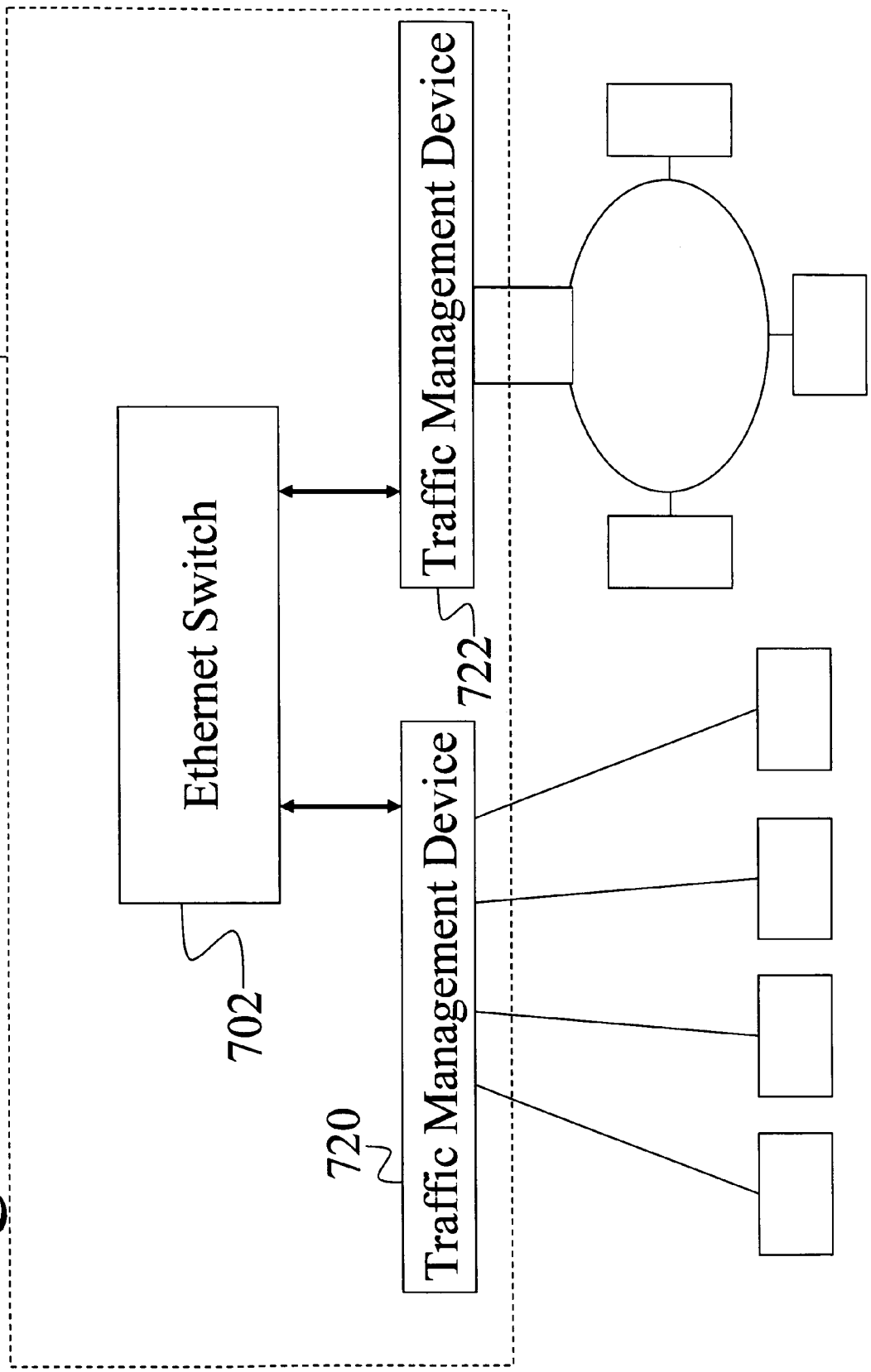
FIG. 7 is a simplified block diagram illustrating an enhanced switching system according to an embodiment of the present invention.

FIG. 7 is a simplified block diagram of an example switching system 700. The switching system 700 consists of Ethernet switch 702 connecting with both TMD 720 and TMD 722. As illustrated, the switching system 700 can connect to networks of different topologies. TMD 720 is connected to a network of star topology, and TMD 722 is connected to a network of ring topology. Likewise, the switching system 700 can also be connected to networks of tree topology, bus topology, etc.

Figure 8:
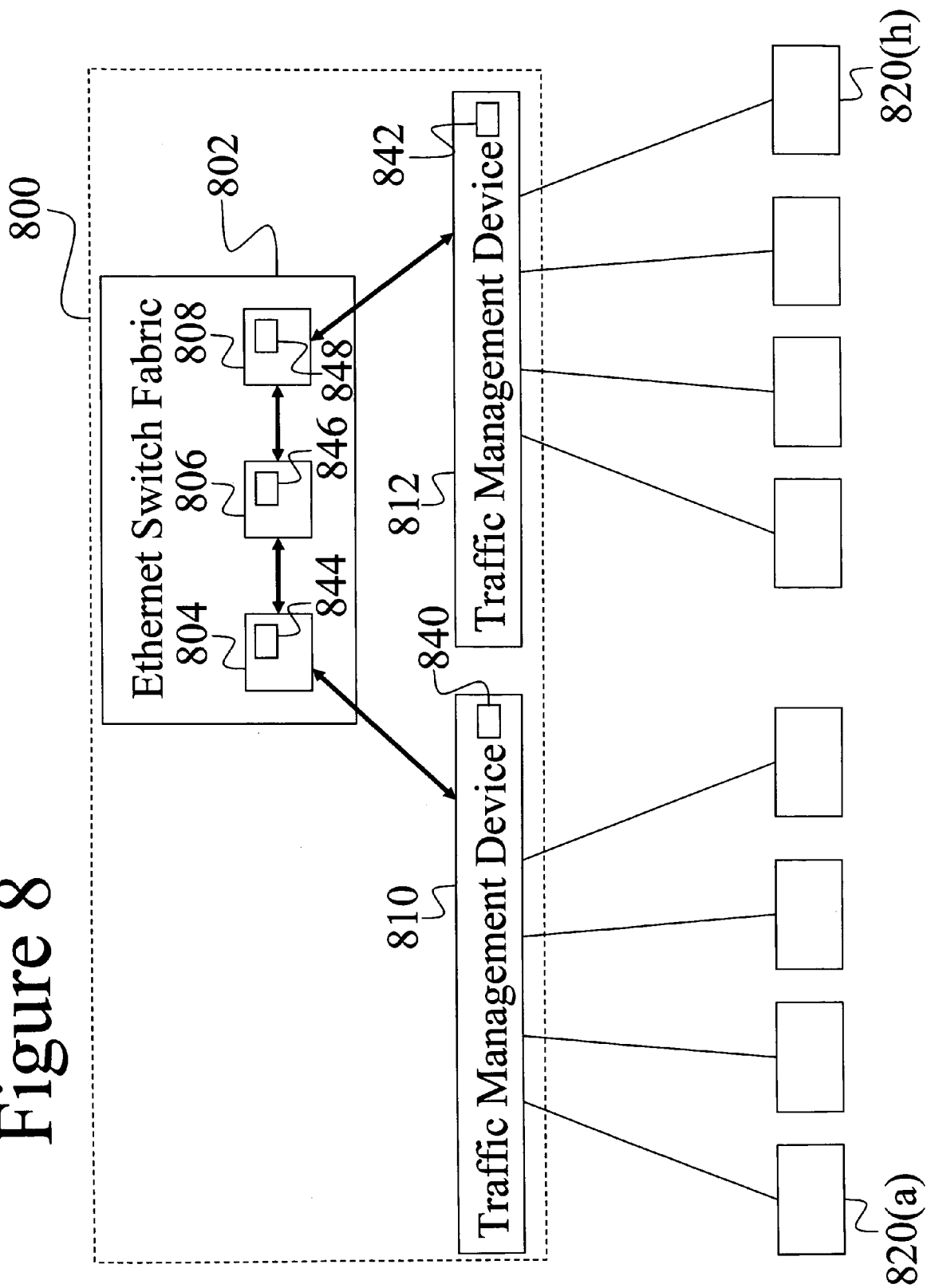
FIG. 8 is a simplified block diagram illustrating an enhanced switching system according to an embodiment of the present invention.

FIG. 8 is a simplified block diagram of an example switching system 800. The switching system 800 includes Ethernet switch fabric 802 and TMDs 810, 812. The Ethernet switch fabric 802 comprises Ethernet switches 804, 806, and 808. Ethernet switch 804 connects to Ethernet 806, and Ethernet switch 806 connects to Ethernet 808. TMD 810 is connected to Ethernet switch 804, and TMD 812 is connected to Ethernet switch 808. As illustrated, the Ethernet switch fabric 802 can includes several Ethernet switches 804, 806, and 808, connecting TMD 810 and TMD 812 together.

TMD 810 has a table 840 storing the mapping between the Internal Addresses of other TMDs and External Addresses in the system. Likewise, TMD 812 has a mapping table 842. Ethernet switch 804 similarly has a table 844 storing the mapping between Internal Addresses and its ports. Likewise, Ethernet switch 806 has a mapping table 846, and Ethernet switch 808 has a mapping table 848. Because the Ethernet switch fabric 802 does not understand the External Address space, none of the mapping tables 844, 846, and 846 contains External Address information.

As described with reference to the switching system 100 above, when network entity 820(*a*) sends an external network packet to network entity 820(*h*), TMD 810 first examines the External Network Header to get both the Forwarding Header and the Internal Network Header to be prepended to the packet to forward it to the destination TMD 812 connected to network entity 820(*h*) and to have it suitably processed by the destination TMD 812. TMD 810 prepends a Forwarding Header and Internal Network Header to the External Network Packet to convert it into an Internal Network Packet, addresses the Internal Network Packet to TMD 812's Internal Address, and submits the Internal Network Packet to Ethernet switch fabric 802. The Internal Network Packet is transferred from Ethernet switch 804 to Ethernet switch 806, then to Ethernet switch 808, before it was transferred to Ethernet switch 808's port coupled with TMD 812. TMD 812 extracts the Forwarding Header and External Network Packet from the Internal Network Packet, performs any required processing as indicated by the Forwarding Header and forwards the External Network Packet to network device 820(*h*), In summary, enhanced switching functionality can be achieved by a switching system including TMDs 106,108 connected with a generic Ethernet switch fabric 102 and an optional FCD 104.

While the present invention has been described with reference to certain preferred embodiments, those skilled in the art will recognize that various modifications may be provided. For example, the principle of the present invention can be extended such that any number of levels of address spaces and corresponding encapsulation can be continued while still remaining compatible with the Ethernet frame format. Variations upon and modifications to the preferred embodiments are provided for by the present invention.

What is claimed is:

1. A method in a switching system using an Ethernet switch as a switch fabric, the method comprising: receiving flow control information relating to a congestion state of a plurality of ports of the switch fabric; receiving an external network packet from a first network device; creating an internal network packet by encapsulating the received external network packet inside a forwarding header and a layer 2 or Ethernet internal network header, a portion of the forwarding header being stored in the internal network header, wherein the portion includes a source address field used to carry forwarding header information; and directing the internal network packet to a selected port of the plurality of ports based on the flow control information to communicate packet processing information and ingress port information between elements of the switching system using the Ethernet switch as the switch fabric in said switching system.

2. The method of claim 1 further including using an arbitrary layer 2 Ethernet network as the switch fabric in the switching system.

3. The method of claim 1 further including encoding an ingress port of a packet into the switching system in a forwarding header to thereby communicate the ingress port to arbitrary destinations across an Ethernet network.

4. The method of claim 1 wherein the encapsulating the received external network packet includes encapsulating a destination address, wherein the destination address is a multicast that will be delivered to multiple defined ports of the switch fabric.

5. The method of claim 2 wherein the encapsulating the received external network packet includes encapsulating a destination address as a multicast that will be delivered to multiple destinations across the arbitrary (layer 2) Ethernet network being used as a switch fabric.

6. The method of claim 1 further including receiving the internal network packet at the selected port, deencapsulating the internal network packet, processing the external network packet based on the forwarding information stored within the forwarding header, and forwarding the packet to a second network device.

7. The method of using a standard Ethernet switch as a switch fabric as in claim 1 further including generating enhanced flow control messages to provide per destination fairness and class aware switching across the standard Ethernet switch.

8. The method of claim 1 wherein the receiving the flow control information includes receiving the flow control information from a flow control device operatively associated with the Ethernet switch.

9. The method of claim 8 further including:
submitting information relating to packet traffic to the flow control device; and,
maintaining a status of congestion states of the plurality of ports of the switch fabric by the flow control device.

10. The method of claim 9 wherein the submitting the information relating to packet traffic includes submitting information relating to at least one of packet size, packet destination or packet priority.

11. The method of claim 9 further including:
generating queue flow control frames by the flow control device; and,
communicating the queue flow control frames to a traffic management device operatively associated with the switch fabric and the flow control device.

12. The method according to claim 1 further including communicating the encapsulated forwarding information and arbitrary payload within the outer Ethernet frame to the selected port based on the flow control information.

* * * * *